US 6,689,306 B2

(12) United States Patent
Merrifield et al.

(10) Patent No.: US 6,689,306 B2
(45) Date of Patent: Feb. 10, 2004

(54) PROCESS OF MAKING A MULTI-LAYER OUTER SKIN FOR THE EXTERIOR OF A DASH PANEL STRUCTURE OF A VEHICLE

(75) Inventors: Richard Allen Merrifield, Spring Valley, OH (US); James John Sommer, Tipp City, OH (US)

(73) Assignee: Delphi Technologies, Inc., Troy, MI (US)

( * ) Notice: Subject to any disclaimer, the term of this patent is extended or adjusted under 35 U.S.C. 154(b) by 14 days.

(21) Appl. No.: 09/902,989

(22) Filed: Jul. 11, 2001

(65) Prior Publication Data

US 2003/0011174 A1 Jan. 16, 2003

(51) Int. Cl.[7] .................. B29C 47/06; B29C 51/02; B29C 51/10; B29C 51/14
(52) U.S. Cl. .................. 264/511; 264/139; 264/145; 264/173.18; 264/554
(58) Field of Search .................... 264/145, 173.18, 264/173.16, 174.1, 920, 921, 139, 511, 554

(56) References Cited

U.S. PATENT DOCUMENTS

| 4,287,147 A | * | 9/1981 | Hungerford | 264/146 |
| 4,652,325 A | * | 3/1987 | Benge et al. | 156/244.11 |
| 4,854,996 A | * | 8/1989 | Baus | 264/171.13 |
| 4,877,682 A | * | 10/1989 | Sauers et al. | 428/412 |
| 5,344,183 A | * | 9/1994 | Hersman et al. | 264/257 |
| 5,743,986 A | * | 4/1998 | Colombo | 264/173.16 |
| 5,811,046 A | * | 9/1998 | Dous et al. | 264/173.18 |
| 5,866,224 A | * | 2/1999 | Ang et al. | 428/43 |
| 6,079,733 A | * | 6/2000 | Towler | 280/728.2 |
| 6,454,974 B1 | * | 9/2002 | Wilson | 264/46.8 |
| 2002/0055006 A1 | * | 5/2002 | Vogel et al. | 428/520 |

* cited by examiner

Primary Examiner—Leo B. Tentoni
(74) Attorney, Agent, or Firm—Scott A. McBain

(57) ABSTRACT

A skin layer for covering a dash panel structure in overlying relation to an air bag cushion assembly. The skin layer is of a multi-layered construction including a top layer of virgin polymeric material forming a show surface of controlled predefined color across the vehicle dash panel and an underlying layer of regrind material formed from the scraps of material generated during molding and trimming of the dash panel covers. A tear seam may be scored across the underside of the skin extending into the underlying layer of recycled material in a desired break-out pattern for the air bag cushion. The skin layer may be disposed across an underlying layer of foam which in turn is disposed across a supporting panel structure.

8 Claims, 2 Drawing Sheets

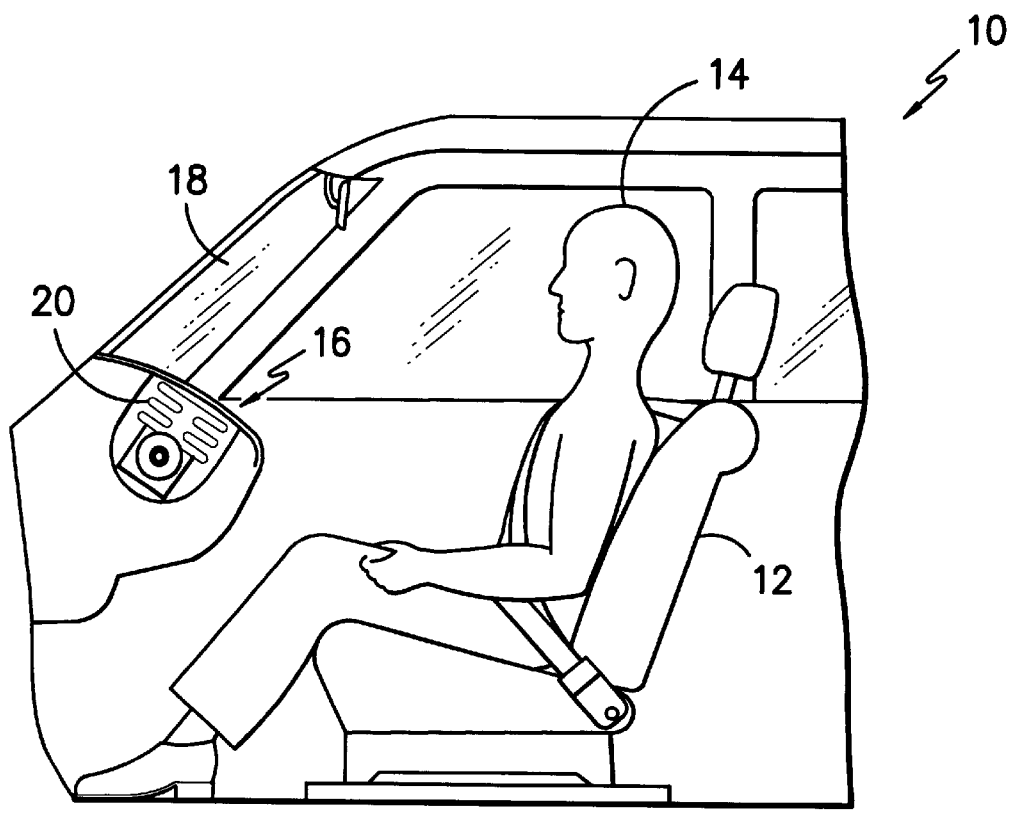
FIG. -1-
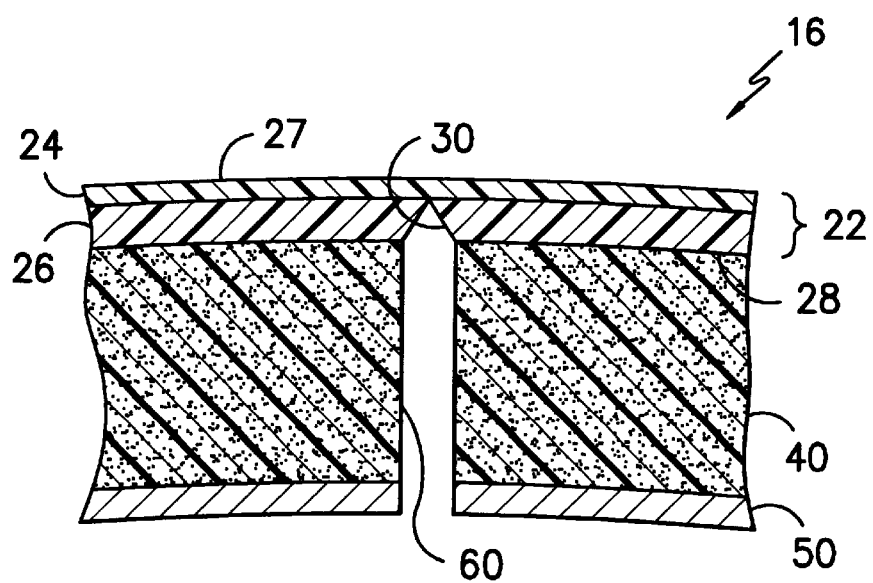
FIG. -2-

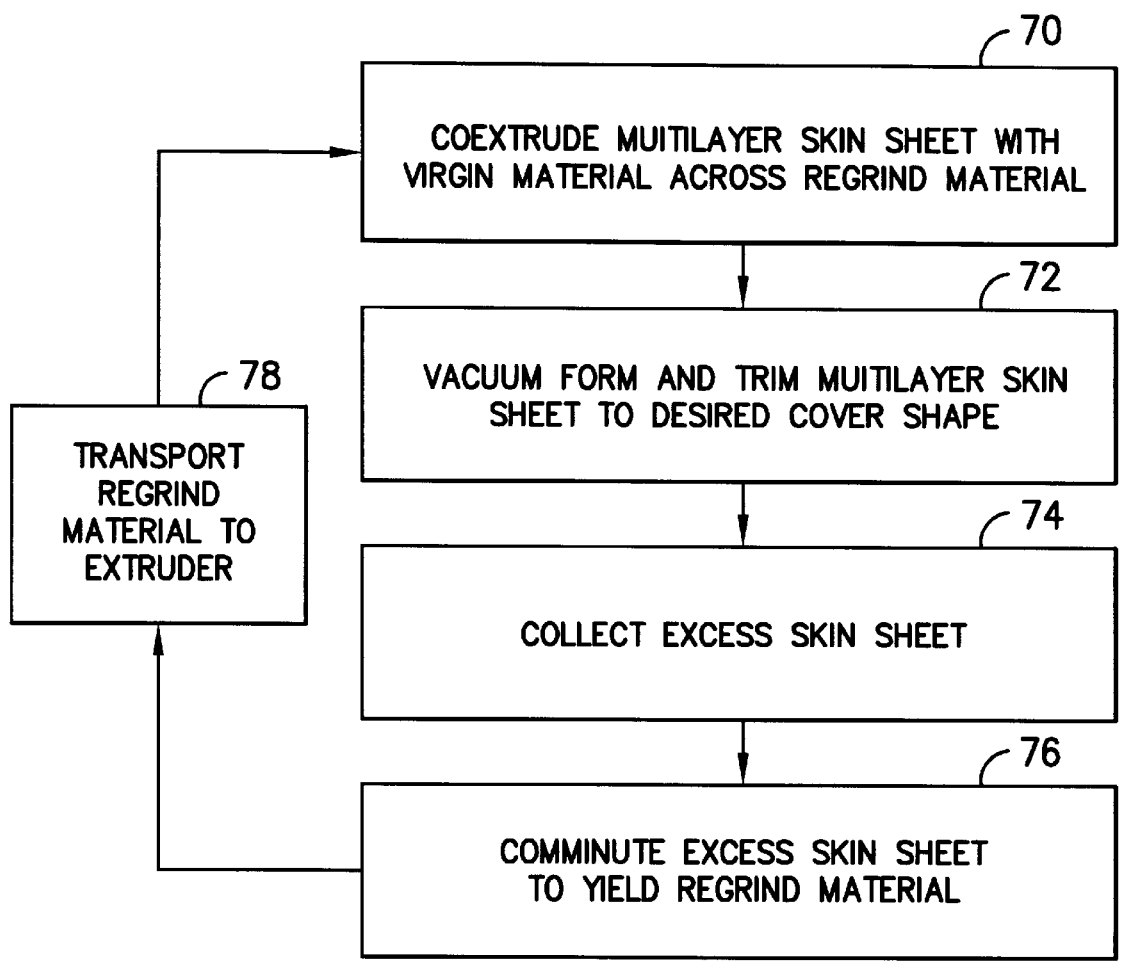
FIG. -3-
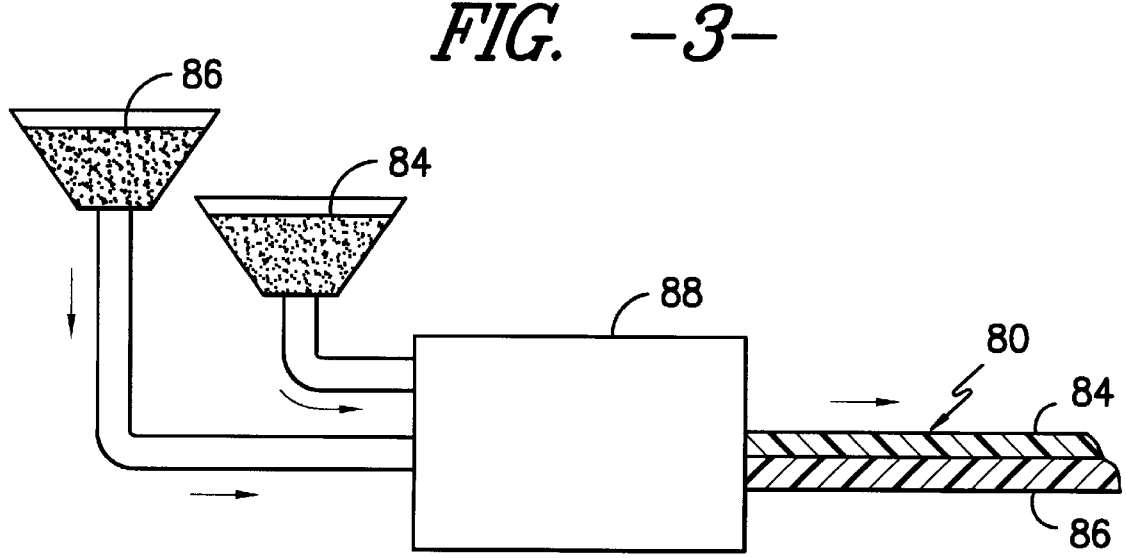
FIG. -4-

PROCESS OF MAKING A MULTI-LAYER OUTER SKIN FOR THE EXTERIOR OF A DASH PANEL STRUCTURE OF A VEHICLE

TECHNICAL FIELD

This invention relates to a dash panel structure for an automobile. More particularly, the invention relates to a skin material for an instrument panel incorporating a surface layer of virgin material of predefined color and an interior layer of regrind material for disposition in overlying relation to the door panel for an inflatable air bag cushion. A method of manufacturing such skin material is also provided.

BACKGROUND OF THE INVENTION

It is well known in motor vehicles to provide an air bag module which includes an inflatable air bag cushion for the protection of a vehicle occupant in the event of a collision. The air bag module typically includes an inflator for discharging an inflation medium such as high pressure gas or the like into the air bag cushion upon the occurrence of a predetermined level of vehicle deceleration or other measurable vehicle condition.

Inflatable air bag cushions may be disposed at a number of locations within the vehicle so as to provide protection for the occupants therein during various collision events. In particular, it is known to utilize an inflatable air bag cushion stored within the hub of the steering wheel for protection of the operator of the vehicle and to utilize an inflatable air bag cushion deployable from the dash panel for protection of a passenger within the vehicle during a collision event.

In order to facilitate the deployment of inflatable air bag cushions from the dash panel, it is known to incorporate a tear pattern partially across an outer skin layer forming the show surface of the dash panel in the region over the air bag cushion. This tear pattern preferentially tears to form a desired deployment opening pattern at a defined location across the surface of the dash panel as the air bag cushion is inflated. The materials forming the outer skin layer are typically thermoplastic polymers of substantial resiliency such as thermoplastic polyolefin (TPO) and polyvinyl chloride (PVC). In the typical manufacturing process, the outer skin layer is of a single layered construction overlying a resilient foam material. The foam and skin are typically supported across an underlying substrate door panel of frangible character to permit egress of the underlying air bag cushion. The material forming the outer skin layer typically includes a colorant to impart a predefined coloration across the surface of the dash panel.

During the typical manufacturing process, the outer skin layer is in the form of a single layered sheet extruded to a desired thickness from virgin stock material of a particular color. The single layer sheet is thereafter transferred to a vacuum mold for shaping to the desired profile geometry for the dash panel. During the vacuum molding process, excess material is trimmed away and discarded. The foam layer may thereafter be cast across the underside of the molded skin to form a foam backed composite. Prior to application of foam, the interior surface of the outer skin layer may be scored to a predefined depth in a pattern corresponding to a breakout pattern forming a deployment path for the underlying air bag cushion.

As will be appreciated, the vacuum forming and trimming of the polymer sheet to form the outer skin layer to the desired configuration may generate a substantial quantity of waste material. Heretofore, this waste has generally been discarded. The practice of discarding such material may give rise to added cost both in terms of the need to purchase larger volumes of virgin skin-forming material as well as in the cost associated with the proper disposal of the portions of the skin material which are not used.

SUMMARY OF THE INVENTION

The present invention provides advantages and alternatives over the prior art by providing a skin layer for disposition in overlying relation to an air bag cushion assembly. The skin layer is of a multi-layered construction including a top layer of virgin (i.e. non recycled) polymeric material forming a show surface of controlled predefined color across the vehicle dash panel and an underlying layer of regrind material formed from scraps of material generated during molding and trimming of the dash panel covers. The scraps may be of different colored materials. A tear seam may be scored across the underside of the skin extending into the underlying layer of recycled material in a desired break-out pattern for the air bag cushion. The skin layer may be disposed across an underlying layer of foam which in turn is disposed across a supporting panel structure.

BRIEF DESCRIPTION OF THE DRAWINGS

The accompanying drawings which are incorporated in and which constitute a part of this specification, illustrate potentially preferred embodiments and practices in accordance with the present invention and, together with the general description of the invention given above and the detailed description set forth below, serve to explain the principles of the invention wherein:

FIG. 1 illustrates the interior of an automobile including a dash panel structure overlying an inflatable air bag;

FIG. 2 is a exemplary cross-sectional view taken through the dash panel structure of FIG. 1 at the location of a deployment opening pattern overlying the inflatable air bag;

FIG. 3 is a flow chart illustrating the basic process steps involved in the production of a multi-layer skin in accordance with one exemplary practice according to the present invention; and FIG. 4 is a representative view of a coextrusion process as may be used in producing the sheet material forming the multi-layer skin according to the present invention.

While the invention has been illustrated and generally described above and will hereinafter be described in connection with certain potentially preferred embodiments and procedures, it is to be understood that in no event is the invention to be limited to such illustrated and described embodiments and procedures. On the contrary, it is intended that the present invention shall extend to all alternatives and modifications as may embrace the broad principles of this invention within the true spirit and scope thereof.

DESCRIPTION OF THE PREFERRED EMBODIMENT

Reference will now be made to the drawings, wherein to the extent possible like reference numerals are utilized to designate like components throughout the various views. In FIG. 1 it is seen that a vehicle 10 may include a seating structure 12 which supports an occupant 14 in generally opposing relation to a dash panel 16 extending below a windshield 18. An inflatable air bag cushion 20 is housed within the dash panel 16 for outward deployment through the surface of the dash panel 16 towards the occupant 14.

As best illustrated in FIG. 2, in the region overlying the air bag cushion 20 the dash panel 16 is preferably of a multi-layered construction. This multi-layered construction preferably includes an outer skin layer 22 including an exterior layer 24 of colored virgin polymeric material and an interior layer 26 of recycled regrind material as will be described further hereinafter. The exterior layer 24 preferably forms a substantially smooth extended outer show surface 27 of predefined color corresponding to the color of the virgin polymeric material.

The outer skin layer 22 also has an underside 28 facing away from the outer show surface 27. As illustrated, the underside 28 of the outer skin layer 22 may include a score cut 30 extending at least partially into the interior layer 26 so as to reduce the overall thickness of the outer skin layer 22 in a localized deployment opening pattern in the region overlying the air bag cushion 20. As will be appreciated, such a reduction in thickness provides a preferential weakening of the outer skin layer 22 along the score cut 30 as the air bag cushion 20 undergoes inflation. According to the illustrated and potentially preferred embodiment, the score cut extends substantially through the interior layer 26 to the exterior layer 24. However, deeper or more shallow score cut depths may also be utilized. According to one potentially preferred practice, the exterior layer remains substantially intact such that that the presence of the underlying score cut 30 may be more effectively hidden from view by the occupant 14. The score cut 30 may be applied by any appropriate means to provide a controlled depth including by way of example only, a laser or ultrasonic knife unit.

In order to provide the dash panel 16 with structural support, a layer of cushioning support material 40 is preferably provided in the region below the outer skin layer 22. It is contemplated that the cushioning support material 40 may be of any number of different constructions although a foamed material such as a urethane foam may be potentially preferred. A substrate panel 50 of dimensionally stable plastic or other suitable material is preferably disposed below the cushioning support material. According to the potentially preferred embodiment, the cushioning support material 40 and the substrate panel 50 thus serve cooperatively to provide a support structure for the outer skin layer 22.

As illustrated, the substrate panel 50 and the cushioning support material 40 may be provided with a grooved break-out channel 60 disposed in substantial alignment below the score cut 30 within the outer skin layer 22. While the break-out channel 60 is illustrated as extending completely across the cushioning support material, it is likewise, contemplated that the break-out channel 60 may extend only partially into the cushioning support material 40 or may be eliminated entirely if desired. According to one embodiment, the break-out channel may be in the form of a plurality of discrete slots arranged across the underside of the substrate panel 50 in a pattern corresponding substantially to the pattern of the score cut across the underside 28 of the outer skin layer 22. By way of example only, and not limitation typical patterns for the score cut may include "H" and "U" shaped patterns as will be well known to those of skill in the art.

Regardless of the nature or arrangement of the cushioning support material 40 and/or substrate panel 50 and any break-out channel therein, the outer skin layer 22 according to the present invention is of a multi-layered construction. According to the illustrated and potentially preferred embodiment, the exterior layer 24 defining the outer show surface 27 is preferably formed of a virgin, non recycled polymeric material thermoplastic polyolefin (TPO) or polyvinyl chloride (PVC) of predefined coloration such as is currently used and will be well known to those of to those of skill in the art. The interior layer 26 is preferably formed of a regrind polymeric material substantially similar in chemical composition to the material forming the exterior layer 24 but formed from materials of multiple different colorations. The outer skin layer 22 is preferably formed by coextrusion of the materials forming the exterior layer 24 and the interior layer 26 such that the outer skin layer 22 is of a substantially unitary laminate construction.

As illustrated in FIGS. 3 and 4, according to a potentially preferred practice the desired multi-layer outer skin 22 may be formed in a highly efficient manner utilizing otherwise disposable waste products resulting from the current skin forming and molding processes. According to a potentially preferred practice, in a first coextrusion step 70, a multi-layered skin sheet material 80 is formed with a layer of colored virgin polymeric material 84 corresponding to the exterior layer 24 disposed across a layer of regrind material 86 corresponding to the interior layer 26 of the outer skin 22.

The coextrusion preferably takes place by feeding the virgin material 84 and the regrind material 86 into a coextruder 88 as will be well known to those of to those of skill in the art. The virgin material 84 and the regrind material 86 are preferably each in a substantially solid pellet or particulate form during the feeding operation so as to facilitate ease of material handling. Upon being fed into the coextruder 88, the virgin material 84 and the regrind material 86 undergo at least a partial melting and attachment in a substantially laminar relationship as shown.

As illustrated, within the outer skin sheet material 80, the regrind material 86 is preferably thicker than the overlying virgin material 84. According to one potentially preferred practice, the thickness of the regrind material 86 is about twice as great as the thickness of the virgin material 84. According to the potentially preferred practice, the chemical composition of the virgin material 84 and the regrind material 86 is substantially similar such that chemical bonding takes place at the interface between the virgin material 84 and the regrind material 86.

Following formation of the skin sheet material 80 in the coextrusion step 70, the skin sheet material 80 undergoes further processing to yield the molded outer skin layer 22 for use in the dash panel 16 as previously described. According to the potentially preferred practice, the skin sheet material 80 is subjected to a vacuum forming step 72 during which the skin sheet material 80 is placed in a vacuum mold as will be well known to those of to those of skill in the art to yield a profile geometry substantially corresponding with the desired profiled geometry for the dash panel 16. During this vacuum forming step 72, it is generally necessary to trim substantial portions of the skin sheet material 80 to yield the desired shape. In addition, from time to time some portion of the molded skin sheet material may become damaged during the molding operation and thus be rejected for further use.

According to the exemplary process, following the trimming operation, a collection process 74 is undertaken wherein the trimmings and other portions of excess skin sheet material 80 of different colors are collected for reprocessing. As shown, following the collection step 74, the material collected is subject to a comminution step 76 to reduce the excess skin sheet material 80 to a substantially particulate form suitable for feed to the coextruder 88. The resultant regrind material 86 is thereafter the subject of a transport step 78 wherein the particulate matter resulting from the comminution step is transported to a feed bin for reintroduction to the coextruder 88. Comminution preferably gives rise to an intimate mixture of polymeric materials of multiple different colors As will be appreciated, the comminution step may utilize any suitable size reducing technique, although a standard mechanical grinding operation may be potentially preferred. Accordingly, while the term regrind material is used herein to denote the recycled polymeric material forming the interior layer 26 of the outer skin 22, it is to be understood that such material is in no way limited to material produced by a mechanical grinding operation. Rather it is contemplated that the regrind material may result from virtually any appropriate size reducing technique including, by way of example only, and not limitation, shreading, cryogenic pulverization, high pressure hydraulic impingement, and the like.

The process as illustrated in FIGS. 3 and 4 is to be understood to represent a substantially steady state process wherein the quantity of excess skin sheet material is adequate to meet the total requirements for regrind material. As will be appreciated, upon reaching steady state, the interior layer 26 within the outer skin layer 22 is formed substantially entirely of regrind material 86. Of course, in the event that the quantity of excess skin sheet material 80 available for reprocessing is inadequate, it is contemplated that the available regrind material 86 may be mixed with either virgin material or recycled polymeric material of similar composition from other recycling sources. Accordingly, it is to be appreciated that the present invention likewise extends to such processes and the constructions resulting therefrom.

As will be appreciated, the outer skin layer 22, according to the present invention, provides a high quality outer show surface 27 for viewing by an occupant 14 within the vehicle 10 while nonetheless incorporating a substantial percentage of recycled material within the body of the outer skin layer 22. Moreover, in the potentially preferred practice wherein the score cut 30 has a depth approximately equal to the thickness of the interior layer 26, the exterior layer 24 of virgin material undergoes no physical degradation due to the scoring operation thereby further enhancing appearance while nonetheless potentially reducing cost and avoiding waste.

While the present invention has been illustrated and described in relation to certain exemplary and potentially preferred embodiments and practices, it is to be understood that such embodiments and practices are illustrative only and that the present invention is in no event to be limited thereto. Rather, it is contemplated that modifications and variations to the present invention will no doubt occur to those of to those of skill in the art upon reading the above description and/or through a practice of the invention. It is therefore contemplated and intended that the present invention shall extend to all such modifications and variations which incorporate the broad aspects of the present invention within the full spirit and scope of the invention as claimed and all equivalents thereto.

What is claimed is:

1. A method for forming a multi-layer outer skin for the exterior of a dash panel structure of a vehicle, wherein the outer skin comprises a multi-layer moldable sheet adapted for disposition in overlying relation to an underlying support structure disposed in overlying relation to an inflatable air bag cushion, the method comprising the steps of:

providing a virgin polymeric material of predefined color;

providing a regrind polymeric material including a plurality of different colored polymeric constituents; and forming the virgin polymeric material and the regrind polymeric material into a multi-layer laminate sheet structure defining the outer skin including an exterior layer consisting essentially of the virgin polymeric material for disposition across the exterior of the dash panel structure facing away from the underlying support structure and at least one interior layer in contacting relation with the exterior layer comprising the regrind polymeric material for disposition between the underlying support structure and the exterior layer; and molding the multi-layer laminate sheet structure to a profiled geometry for disposition at the exterior of the dash panel structure.

2. The method as recited in claim 1, wherein the virgin polymeric material and the regrind polymeric material are chemically substantially identical.

3. The method as recited in claim 1, wherein the virgin polymeric material is a thermoplastic polyolefin and the regrind polymeric material is a thermoplastic polyolefin.

4. The method as recited in claim 1, wherein the virgin polymeric material is PVC and the regrind polymeric material is PVC.

5. The method as recited in claim 1, wherein said at least one interior layer is of a thickness greater than the exterior layer.

6. The method as recited in claim 5, wherein said at least one interior layer is about twice the thickness of the exterior layer.

7. A method for forming a multi-layer outer skin for the exterior of a dash panel structure of a vehicle, wherein the outer skin comprises a multi-layer moldable sheet adapted for disposition in overlying relation to an underlying support structure disposed in overlying relation to an inflatable air bag cushion, the method comprising the steps of:

providing a virgin polymeric material of predefined color;

providing a regrind polymeric material including a plurality of different colored polymeric constituents;

coextruding the virgin polymeric material and the regrind polymeric material into a multi-layer sheet structure defining the outer skin comprising a face side defining the exterior of the dash panel structure and an underside, the multi-layer sheet structure including an exterior layer consisting essentially of the virgin polymeric material disposed across the face side and at least one interior layer comprising the regrind polymeric material for disposition in contacting relation with the exterior layer between the support structure and the exterior layer;

molding the multi-layer sheet structure to a profiled geometry for disposition at the exterior of the dash panel structure; and applying a patterned deployment opening score cut of predefined depth across the underside at least partially into said at least one interior layer such that said score cut does not extend into the exterior layer.

8. The method as recited in claim 7, wherein the score cut extends substantially across said at least one interior layer to the exterior layer.

* * * * *